(12) United States Patent
Chang (10) Patent No.: US 10,630,890 B2
(45) Date of Patent: Apr. 21, 2020

(54) THREE-DIMENSIONAL MEASUREMENT METHOD AND THREE-DIMENSIONAL MEASUREMENT DEVICE USING THE SAME

(71) Applicant: Wistron Corporation, New Taipei (TW)

(72) Inventor: Yao-Tsung Chang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 296 days.

(21) Appl. No.: 15/418,880

(22) Filed: Jan. 30, 2017

(65) Prior Publication Data

US 2018/0041694 A1    Feb. 8, 2018

(30) Foreign Application Priority Data

Aug. 4, 2016    (TW) .............................. 105124767 A (51) Int. Cl.

| | | |
|---|---|---|
| *G06F 3/01* | (2006.01) | |
| *G06F 1/32* | (2019.01) | |
| *G06F 3/0484* | (2013.01) | |
| *G06K 9/00* | (2006.01) | |
| *G06T 7/00* | (2017.01) | |
| *G02B 27/01* | (2006.01) | |
| *H04N 5/232* | (2006.01) | |

(Continued)

(52) U.S. Cl.
CPC ..... *H04N 5/23219* (2013.01); *G01B 11/2518* (2013.01); *G06T 7/521* (2017.01); *G06T 7/55* (2017.01); *H04N 13/204* (2018.05); *H04N 13/296* (2018.05); *G06T 2207/10028* (2013.01); *G06T 2207/30201* (2013.01)

(58) Field of Classification Search
CPC . G06T 7/55; G06T 7/521; G06T 2207/10028; G06T 2207/30201; H04N 13/204; H04N 13/296; G01B 11/2518
USPC .......................................................... 348/78
See application file for complete search history.

(56) References Cited

U.S. PATENT DOCUMENTS

| | | |
|---|---|---|
| 8,848,201 B1 | 9/2014 | Bruce et al. |
| 2014/0043227 A1* | 2/2014 | Skogo ..................... G06F 1/325 345/156 |

(Continued)

OTHER PUBLICATIONS

TIPO Office Action dated Jun. 6, 2017 in corresponding Taiwan application (No. 105124767).

(Continued)

*Primary Examiner* — Susan E. Hodges
(74) *Attorney, Agent, or Firm* — McClure, Qualey & Rodack, LLP (57) ABSTRACT

A three-dimensional (3D) measurement method includes steps of: detecting a facial orientation and a gaze direction of a user through a field of view detection unit; determining an interested field of view according to the facial orientation and the gaze direction, and configuring a first set of scanning parameters according to the interested field of view through an computation control unit; and performing a first structured-light scan on a first scanning region corresponding to the interested field of view based on the first set of scanning parameters, and selectively performing a second structured-light scan on a second scanning region which is outside the first scanning region based on a second set of scanning parameters through a scanning unit.

16 Claims, 6 Drawing Sheets

(51) Int. Cl.
*H04N 13/204* (2018.01)
*H04N 13/296* (2018.01)
*G06T 7/55* (2017.01)
*G06T 7/521* (2017.01)
*G01B 11/25* (2006.01)

(56) References Cited

U.S. PATENT DOCUMENTS

2014/0108842 A1* 4/2014 Frank .................... G06F 17/28
                                                        713/323
2014/0361977 A1* 12/2014 Stafford ............. G02B 27/0093
                                                        345/156
2015/0169053 A1* 6/2015 Bozarth ............. G06K 9/00604
                                                        345/156
2017/0285736 A1* 10/2017 Young .................... G06F 3/013

OTHER PUBLICATIONS

English translation of TIPO Office Action dated Jun. 6, 2017 in corresponding Taiwan application (No. 105124767).
CN Office Action dated Mar. 9, 2020 in Chinese application (No. 201610701949.3).

* cited by examiner

THREE-DIMENSIONAL MEASUREMENT METHOD AND THREE-DIMENSIONAL MEASUREMENT DEVICE USING THE SAME

This application claims the benefit of Taiwan application Serial No. 105124767, filed Aug. 4, 2016, the disclosure of which is incorporated by reference herein in its entirety.

TECHNICAL FIELD

The disclosure relates to three-dimensional (3D) measurement methods and 3D measurement devices using the same.

BACKGROUND

In recent years, applications of 3D measurement technologies are becoming increasingly widespread; these include dual-lens 3D cameras which measure the distance between an object and the camera based on differences in the angle of view (AOV) between the two lenses. Another example is the time-of-flight technology, which measures the time elapsed from emitting a beam of detection light (such as a laser beam) to receiving the returned signal for determining the distance to the reflecting surface of the object.

Structured-light scanning technology is another 3D measurement technology; scanning light patterns (spaced stripes) that are projected onto the object's surface from which the image of the scanned object is captured through the optical reception equipment and subsequently analyzed to obtain the 3D morphology of the object. In other words, surface irregularities often distort the shapes of projected stripes. Therefore, the 3D morphology of the object can be estimated from the distortion of the stripes.

However, although most of the existing 3D measurement technologies can detect the 3D morphology of sceneries, considerable computational resources are required from backend equipment in order to calculate the 3D data for each point of each object in the scenery; this increases computation time as well as hardware requirements, which lengthens processing time and raises equipment costs.

Therefore, how to provide effective 3D measurement methods and 3D measurement devices using the same, is an issue to be addressed in the field.

SUMMARY

The present invention relates to a 3D measurement method and a 3D measurement apparatus using the same. Through detecting the user's current interested field of view, and dynamically adjusting structured-light scanning parameters (e.g., scanning region, scanning resolution and/or scanning frequency), the present invention saves computational resources on unnecessary scan data to accelerate processing speed, or enhances the scanning resolution in the user's interested field of view within the same processing time.

According to an aspect of the present invention, a 3D measurement method is provided. The 3D measurement method includes steps of: detecting a facial orientation and a gaze direction of a user through a field of view detection unit; determining an interested field of view according to the facial orientation and the gaze direction, and configuring a first set of scanning parameters according to the interested field of view through an computation control unit; and performing a first structured-light scan on a first scanning region corresponding to the interested field of view based on the first set of scanning parameters, and selectively performing a second structured-light scan on a second scanning region which is outside the first scanning region based on a second set of scanning parameters through a scanning unit.

According to another aspect of the present invention, a 3D measurement device is provided. The 3D measurement device includes a field of view detection unit, a computation control unit and a scanning unit. The field of view detection unit is configured to detect a facial orientation and a gaze direction of a user. The computation control unit is configured to determine an interested field of view according to the facial orientation and the gaze direction, and configure a first set of scanning parameters according to the interested field of view. The scanning unit is configured to perform a first structured-light scan on a first scanning region corresponding to the interested field of view based on the first set of scanning parameters, and selectively perform a second structured-light scan on a second scanning region which is outside the first scanning region based on a second set of scanning parameters.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A number of embodiments are disclosed below for elaborating the invention. However, the embodiments of the invention are for detailed descriptions only, not for limiting the scope of protection of the invention. Furthermore, secondary or unimportant elements are omitted in the accompanying diagrams of the embodiments for highlighting the technical features of the invention.

Figure 1:
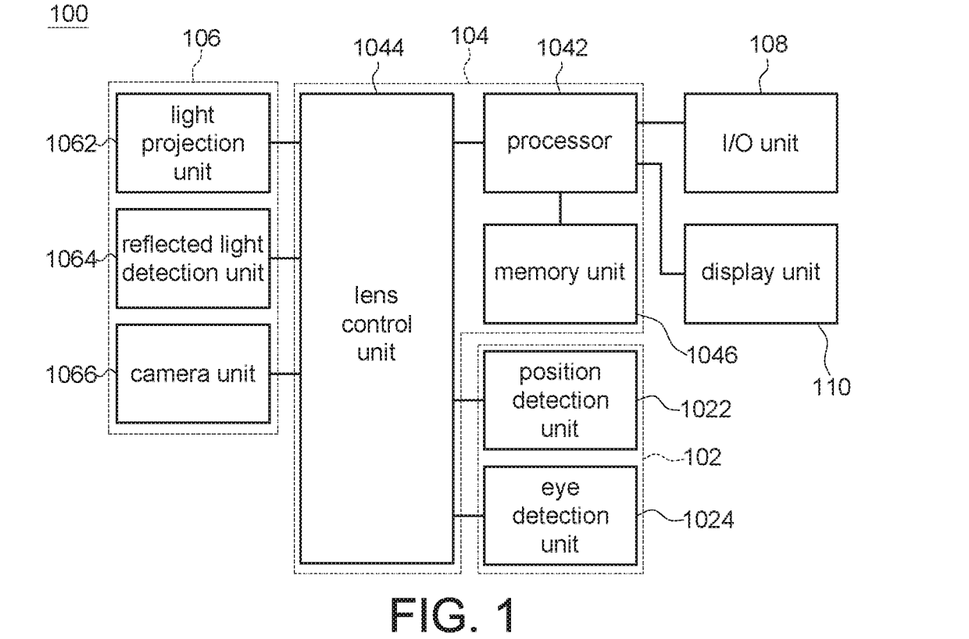
FIG. 1 is a block diagram illustrating a 3D measurement device in accordance with an embodiment of the present invention.

FIG. 1 is a block diagram illustrating a 3D measurement device 100 in accordance with an embodiment of the present invention. The 3D measurement device 100 can be, for example, a 3D camera or any electronic device capable of detecting distance/depth to the objects. The 3D measurement device 100 includes a field of view detection unit 102, a computation control unit 104 and a scanning unit 106. The field of view detection unit 102 may detect the region a user is gazing at, and provides the detected information to the computation control unit 104 to determine an interested field of view. The computation control unit 104 adjusts scanning parameters (e.g., scanning region, scanning resolution, scanning frequency and scanning stripe pattern) used in structured-light scanning performed by the scanning unit 106 according to the interested field of view, so that the scanning unit 106 performs the structured-light scanning on the interested field of view based on the adjusted scanning parameters.

In an embodiment, the 3D measurement device 100 further includes an input/output (I/O) unit 108 and a display unit 110. The I/O unit 108 generates a human-machine interface provided for user operation. The display unit 110 is a display screen for example. Taking a 3D camera as an example, the display unit 110 can be used to display images presented in the camera viewfinder, photos, human-machine interfaces, 3D image information and so on.

The field of view detection unit 102 includes a position detection unit 1022 and an eye detection unit 1024. The position detection unit 1022 is a motion sensor for example, which can detect the user's position/posture to determine which direction the user is currently facing (facial orientation). The position detection unit 1022 can be equipped in wearable devices, such as augmented reality (AR) glasses or mixed reality (MR) glasses. When the user wears the device, the position detection unit 1022 can detect the user's facial orientation, thereby increasing the accuracy in determining the user's field of view.

The eye detection unit 1024 is an eye sensor for example, which can detect the user's eye movement to determine a gaze direction. In an embodiment, when the user's pupils are detected to maintain the same AOV for a certain period of time (e.g., >3 seconds), the eye detection unit 1024 identifies that the user is gazing at a certain location. The direction corresponding to the AOV is the gaze direction.

In an embodiment, the position detection unit 1022 and the eye detection unit 1024 can be integrated into a single device, or implemented by one component realizing functions of these two units. For example, the user's posture and gaze direction can be analyzed by adopting image recognition technology on images of the user captured through a high resolution camera. Subsequently, the region the user is currently gazing at (i.e., the interested field of view) is determined.

The computation control unit 104 includes a processor 1042, a lens control unit 1044 and a memory unit 1046.

The processor 1042 can configure parameters (e.g., scanning region, photographing region, scanning resolution, scanning frequency and scanning stripe pattern) involved in the photographing and the structured-light scan performed by the scanning unit 106. The processor 1042 can also use the 2D image captured through the camera unit 1066 and the distance/depth information corresponding to each image point to obtain the 3D morphology information of the object.

The lens control unit 1044 may use a set of scanning parameters configured by the processor 1042 to control the light projection unit 1062 and reflected light detection unit 1064 to perform specific structured-light scans. Then, the lens control unit 1044 provides the obtained scan data to the processor 1042 for subsequent processing. The lens control unit 1044 may also respond to the control of the processor 1042, driving the camera unit 1066 to capture 2D images and/or to zoom-in or zoom out the lens. The lens control unit 1044 can be hardware, software or the combination thereof. The lens control unit 1044 can be implemented in the processor 1042, or an external circuit coupled to the processor 1042.

The memory unit 1046, coupled to the processor 1042, can be implemented as a memory or any other storage medium accessed by the processor 1042. The memory unit 1046 can be used to store control programs and image data.

The scanning 106 includes, for example, the light projection unit 1062, the reflected light detection unit 1064 and the camera unit 1066.

The light projection unit 1062 can be a coded structured-light projection device which can project a series of coded scanning stripe patterns for structured-light scanning. The beam of light projected by the light projection unit 1062 can be visible light or invisible light, and preferably be infrared laser light. The light projection unit 1062 may response to the control of the lens control unit 1044, adjusting relevant settings for executing structured-light scanning such as scanning stripe patterns (i.e., horizontal, vertical, or other directional striping), thicknesses of scanning strips, scanning frequencies and scanning regions.

The reflected light detection unit 1064 which is controlled by the lens control unit 1044 can detect light reflected from the object projected from the light projection unit 1062. The reflected light detection unit 1064 can be a special light camera that functions in coordination with the projected light. For example, if the projected light is infrared light, an infrared light camera is used as the reflected light detection unit 1064. When the light projection unit 1062 continuously projects M number of scanning stripe patterns onto the object's surface with a scanning frequency, the reflected light detection unit 1064 captures M number of corresponding projected object images. By analyzing the M number of projected object images, the projection angle and the reflection sensing angle can be obtained to calculate the distance to the object reflecting the projected light.

Based on the principle of structured-light scanning, an object point scanned by the structured light may sequentially appear in specific images among the M projected object images. Images in which the object point appears are denoted by the bit of "1" (or "0"), and images without the object point are represented using a bit of "0" (or "1"); this generates a series of data consist of M bits, which corresponds to a specific scanning stripe. For example, if M=7 and the object point appears only in projected object images 1, 4, and 7, the object point corresponds to a scanning strip with a bit data of "1001001". The projection angle for each scanning stripe is known, therefore corresponding reception information such as the reflection sensing angle can be used to calculate the distance of the object point based on triangulation. Additionally, the light projection unit 1062 can project an M number of different coded scanning stripe patterns onto the object's surface through the aforementioned method to achieve a scanning resolution of $2^M$ scanning stripes.

The camera unit 1066 can be a general camera, which can capture 2D images. The computation control unit 104 can obtain the 2D morphology information (e.g., the X- and Y-axis information and the color information) of an object according to the 2D images. Along with the distance information calculated using the projected and reflected light in the previous description, the object's 3D morphology information can be obtained.

Figure 2:
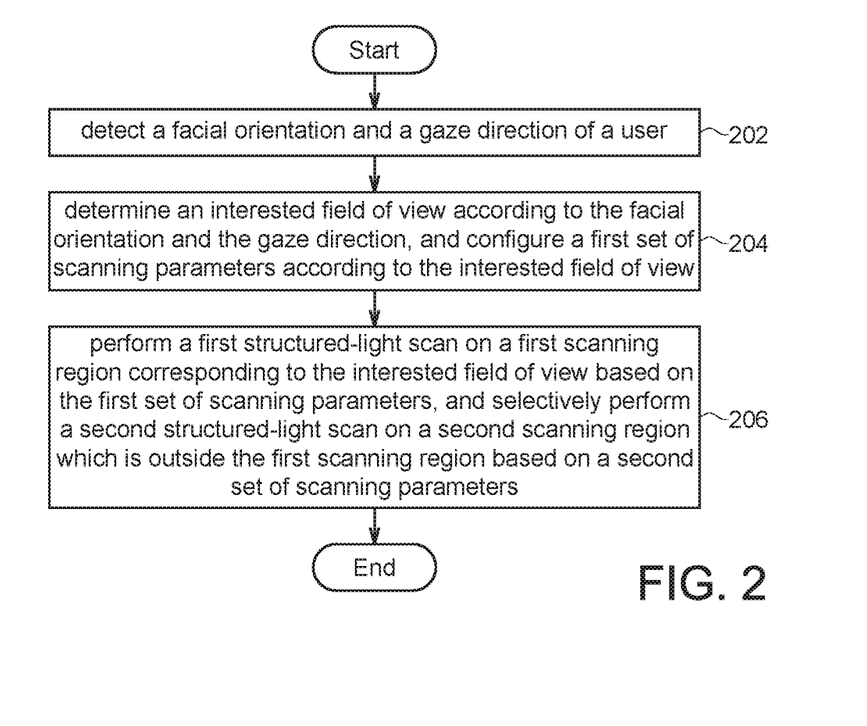
FIG. 2 is a flowchart illustrating a 3D measurement method in accordance with an embodiment of the present invention.

FIG. 2 is a flowchart illustrating a 3D measurement method in accordance with an embodiment of the present invention. The 3D measurement method is adapted but not limited to the 3D measurement device 100 shown in FIG. 1.

At step 202, the field of view detection unit 102 detects the facial orientation and the gaze direction of the user. For example, the field of view detection unit 102 can detect the user's head position to determine the direction that the user is facing (facial orientation), and whether the user's pupils are gazing in a particular direction for a specific period of time. If yes, the user is currently gazing, and the particular direction is referred to as the gaze direction. In an embodiment, the field of view detection unit 102 can estimate the gaze direction based on the displacement of the pupil position relative to a reference point and the maintain duration of the pupils.

At step 204, the computation control unit 104 determines an interested field of view according to the detected facial orientation and the gaze direction, and then uses the interested field of view to determine a first set of scanning parameters. For example, the computation control unit 104 combines the angle information of the facial orientation and the gaze direction and converts them into the same coordinate system, and then defines the region's range, i.e., the interested field of view, that the user is gazing in a specific scene. In some practical applications, the interested field of view corresponds to about 1-2 degrees AOV.

After obtaining the user's interested field of view, the computation control unit 104 establishes a first scanning region for the interested field of view, and configures a first set of scanning parameters for the first scanning region according to the range of the interested field of view and the position and size of the gazed object(s) in the interested field of view. For example, the first set of scanning parameters includes at least one of the following: the size, shape and position of the first scanning region, a first scanning resolution for the first scanning region, a first scanning frequency for the first scanning region and a first scanning stripe pattern for the first scanning region.

At step 206, the scanning unit 106 performs a first structured-light scan on the first scanning region corresponding to the interested field of view based on the first set of scanning parameters, and selectively performs a second structured-light scan on a second scanning region which is outside the first scanning region based on a second set of scanning parameters. For example, the second set of scanning parameters includes at least one of the following: the size, shape and position of the second scanning region, a second scanning resolution for the second scanning region, a second scanning frequency for the second scanning region and a second scanning stripe pattern for the second scanning region.

In an embodiment, if the scanning unit 106 performs the first structured-light scan and the second structured-light scan on the first scanning region and the second scanning region, respectively (i.e., the second structured-light scanning is executed by the scanning unit 106), the computation control unit 104 may configure the first and second sets of scanning parameters to be at least partially different from each other, so a to control the scanning unit 106 to differentiate the structured-sight scans for different regions.

Specifically, the regions outside the first scanning region may not be in the user's interested field of view; therefore, the computation control unit 104 can adjust the first and second sets of parameters so that the scanning unit 106 can perform a relatively detailed (e.g., with higher scanning resolution and/or frequency) first structured-light scan for the first scanning region and perform a relatively rough second structured-light scan for the regions (e.g., the second scanning region) outside the first scanning region, thereby improving the scanning efficiency.

Alternatively, the scanning unit 106 performs a structured-light scan for the entire scenery (including the first and second scanning regions) based on the same scanning parameters, while the computation control unit 104 processes the scan data of the first scanning region only, thereby efficiently utilizing the computation resources. In other words, the computation control unit 104 may differentiate the processing of the obtained scan data, so that the usage of computation resources can be centralized on the processing of the scan data corresponding to the interested field of view.

In another embodiment, the scanning unit 106 only performs the first structured-light scan for the first scanning region and pauses all scanning activities in other regions outside the first scanning region, thereby increasing the scanning speeds and reducing the amount of data required to be processed by the backend circuitry.

For better comprehension of the present invention, different scanning configurations of the proposed 3D measurement device are described below in reference to FIGS. 3-11. It is noted that the scanning configurations are for illustrative purposes only, not for limiting the scope of present invention or presenting all possible scanning configurations of the 3D measurement device.

Figure 3:
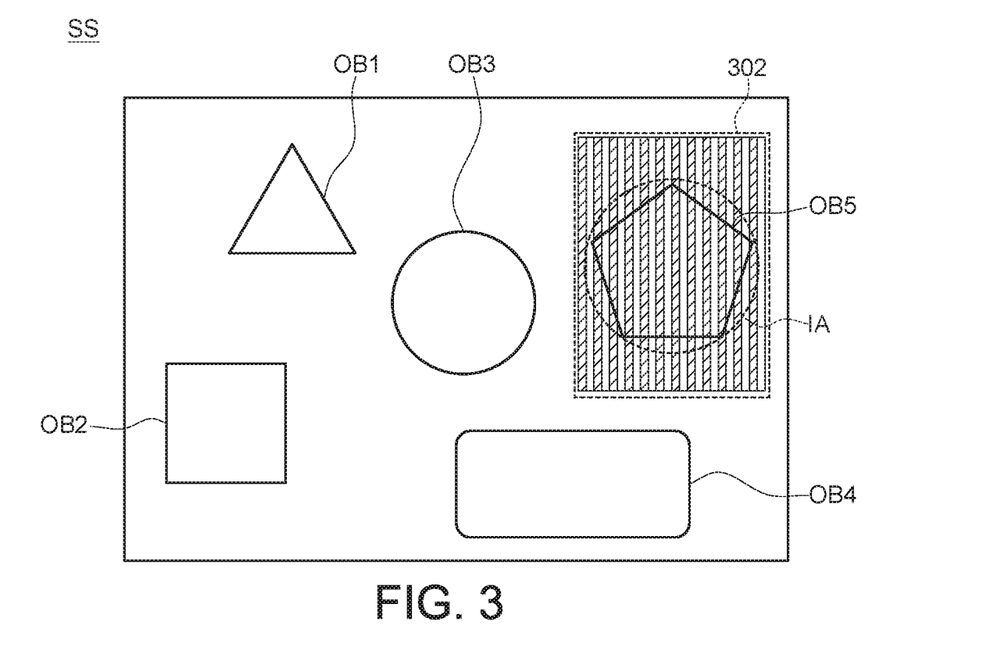
FIG. 3 is a schematic diagram of an example of differentiated structured-light scans for different regions.

FIG. 3 is a schematic diagram of an example of differentiated structured-light scans for different regions. In the example of FIG. 3, the scenery SS includes 5 objects OB1-OB5. If the user is currently gazing at the object OB5, the computation control unit 104 can, based on the eye tracking technology, define an interested field of view IA by using information such as the user's facial orientation and gaze direction detected by the field of view detection unit 102.

After identifying the range of the interested field of view IA, the computation control unit 104 establishes a first scanning region 302 corresponding to the interested field of view IA. As shown in FIG. 3, if the default scanning range of the scanning unit 106 covers the entire scenery SS, the scanning unit 106 may adjust the size of the default scanning range in respond to the control of the computation control unit 104, such that the first scanning region 302 properly covers the interested field of view IA, or locates in the interested field of view IA.

In this example, the computation control unit 104 makes the scanning unit 106 perform the first structured-light scan (represented by spaced stripes in the figure) on the first scanning region 302 only and pause performing any structured-light scan activities on regions outside the first scanning region 302, thereby improving the scanning efficiency.

In an embodiment, the computation control unit 104 may adjust the first set of scanning parameter for the first scanning region 302 to particularly increase the scanning quality of the first scanning region 302. As shown in FIG. 3, if the scanning unit 106 has a default scanning resolution of $2^M$ scanning stripes, after the computation control unit 104 identifies the object (e.g., object OB5) gazed by the user from the interested field of view IA, the computation control unit 104 may increase the default scanning resolution to $2^N$ (where N>M) scanning stripes according to the position and profile (e.g., size and shape) of the gazed object, and use the increased default scanning resolution as the first scanning resolution for the first scanning region 302. The increment of the scanning resolution can be a constant value, or directly correlated to the detail level of the gazed object.

Figure 4:
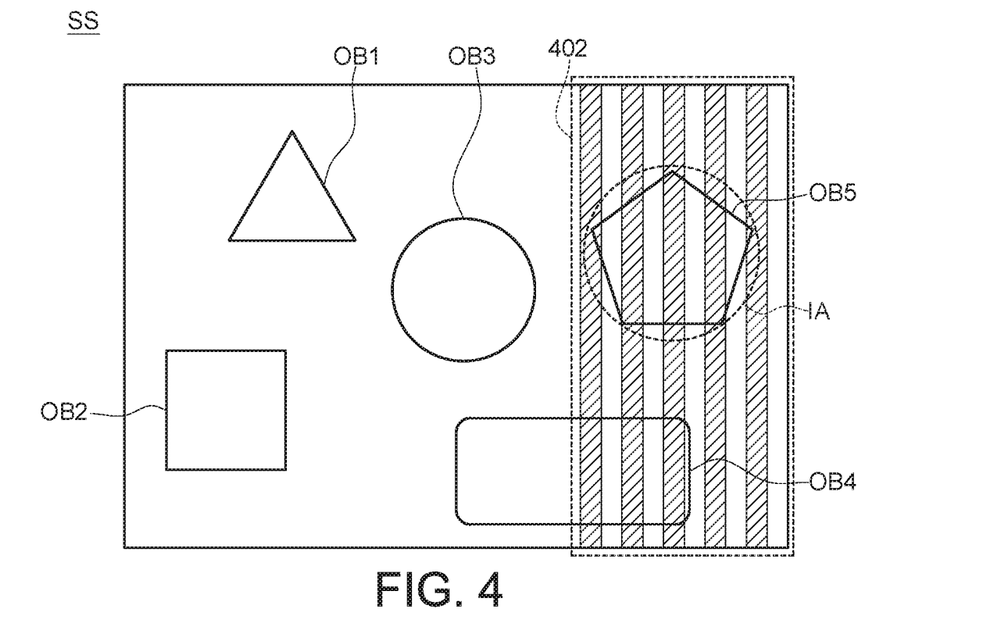
FIG. 4 is a schematic diagram of another example of differentiated structured-light scans for different regions.

FIG. 4 is a schematic diagram of another example of differentiated structured-light scans for different regions. In this example, the scanning unit 106 performs a first structured-light scan in the first scanning region 402 based on a default scanning resolution (represented by thick, spaced stripes in the figure), while pausing all scanning activities in other regions outside the first scanning region 402. Moreover, the scanning unit 106 can adjust only either the length or the width of the default scanning range as the first scanning region 402, so that the first scanning region 402 covers the field of view IA.

Figure 5:
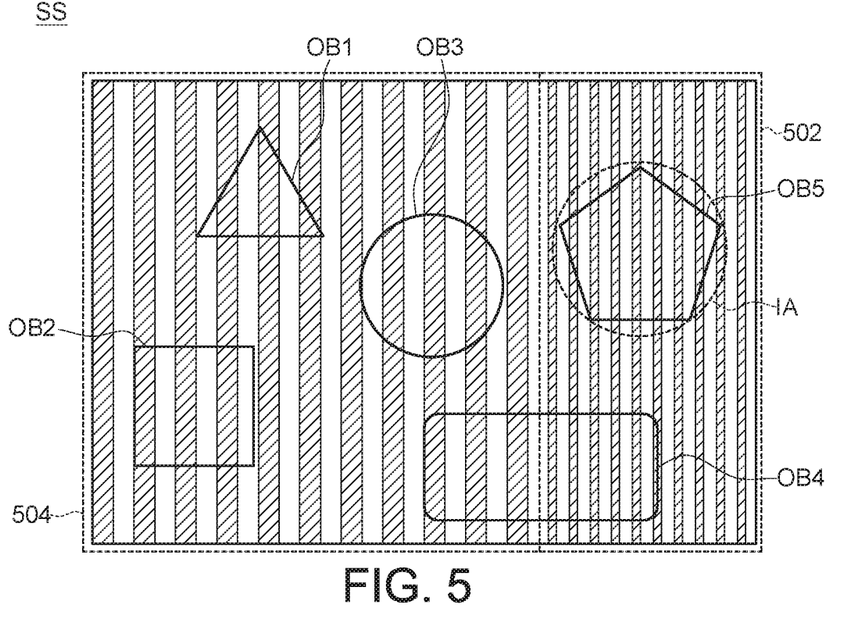
FIG. 5 is a schematic diagram of another example of differentiated structured-light scans for different regions.

FIG. 5 is a schematic diagram of another example of differentiated structured-light scans for different regions. In this example, the scanning unit 106 performs a first structured-light scan (represented by thin, spaced stripes in the figure) on the first scanning region 502 based on a first scanning resolution and performs a second structured-light scan (represented by thick, spaced stripes in the figure) on the second scanning region 504 outside the first scanning region 502 based on a second scanning resolution. The first scanning resolution is higher than the second scanning resolution. In some embodiments, the first set of scanning parameters can be completely or partially configured to be superior to the second set of scanning parameters (e.g., the first scanning frequency is set to be higher than the second scanning frequency) by the computation control unit 104, thereby relatively increasing the scanning quality for the first scanning region 502.

Figure 6:
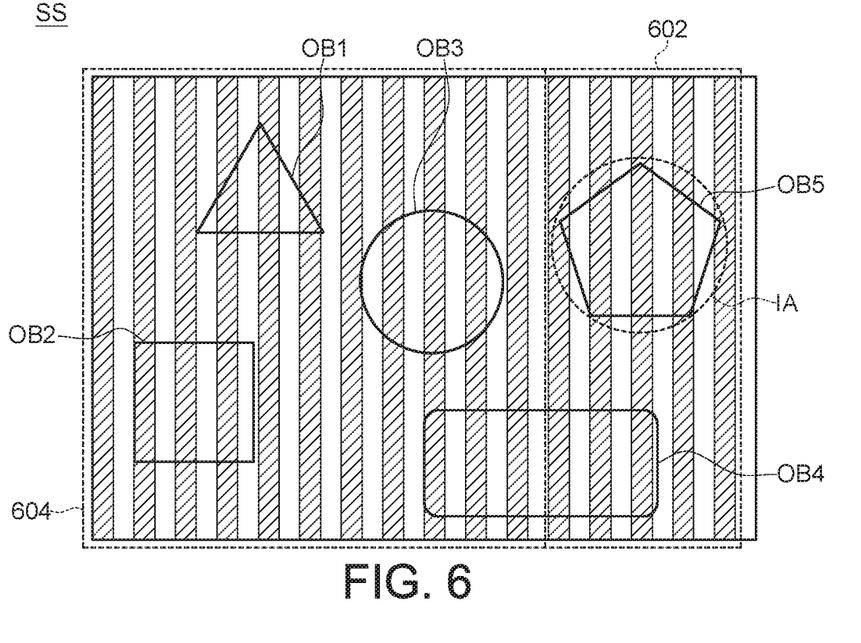
FIG. 6 is a schematic diagram of an example of differentiated processing of scan data for different regions.

FIG. 6 is a schematic diagram of an example of differentiated processing of scan data for different regions. In this example, the scanning unit 106 performs the structured-light scan on the entire scenery SS based on a single scanning resolution (e.g., default scanning resolution). The computation control unit 104 executes depth estimation only for the scan data of the first scanning region 602 corresponding to the interested field of view IA, so as to obtain the 3D morphology information of the object in the first scanning region 602, thereby reducing the amount of data required to be processed.

As shown in FIG. 6, the scanning unit 106 performs a first structured-light scan in the first scanning region 602 based on a first scanning resolution and performs a second structured-light scan in the second scanning region 604 which is outside the first scanning region 602 based on a second scanning resolution. The first scanning resolution is the same as the second scanning resolution.

Performing the first structured-light scan on the first scanning region 602 will generate first scan data (e.g., the image portions corresponding to the first scanning region 602 in the M number of projected scenery images); performing the second structured-light scan on the second scanning region 604 will generate second scan data (e.g., the image portions corresponding to the second scanning region 604 in the M number of projected scenery images). In this example, the computation control unit 104 only adopts the first scan data, but not the second scan data, for depth estimation to acquire the objects 3D morphology information. For example, the computation control unit 104 first trims the M number of captured projected scenery images down to only the first scanning region 602 before proceeding to subsequent depth estimation and acquiring the 3D morphology information of the object in the first scanning region 602.

In another embodiment, the computation control unit 104 adopts the first and second scan data for depth estimation to obtain the 3D morphology information of the scenery SS, but the processing of the first scan data will be prioritized over the processing of the second scan data in the computation control unit 104. In other words, with respect the computation control unit 104, the scan data of the first scanning region 602 will be processed before that of the second scanning region 604.

Figure 7:
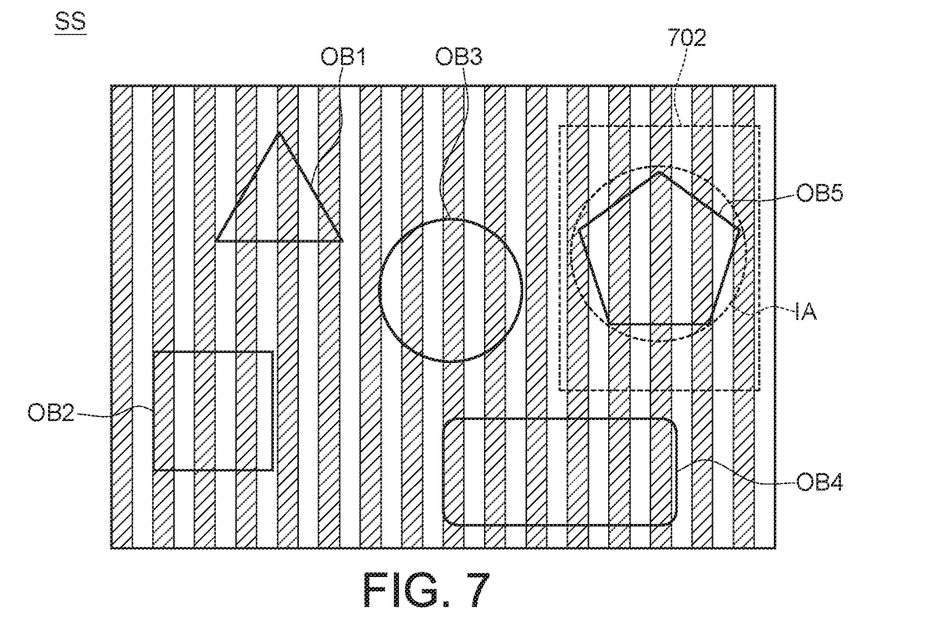
FIG. 7 is a schematic diagram of another example of differentiated processing of the scan data for different regions.

FIG. 7 is a schematic diagram of another example of differentiated processing of the scan data for different regions. The main difference between embodiments of FIGS. 6 and 7 is that in this embodiment, the size of the first scanning region 702 is much closer to the interested field of view IA.

Figure 8:
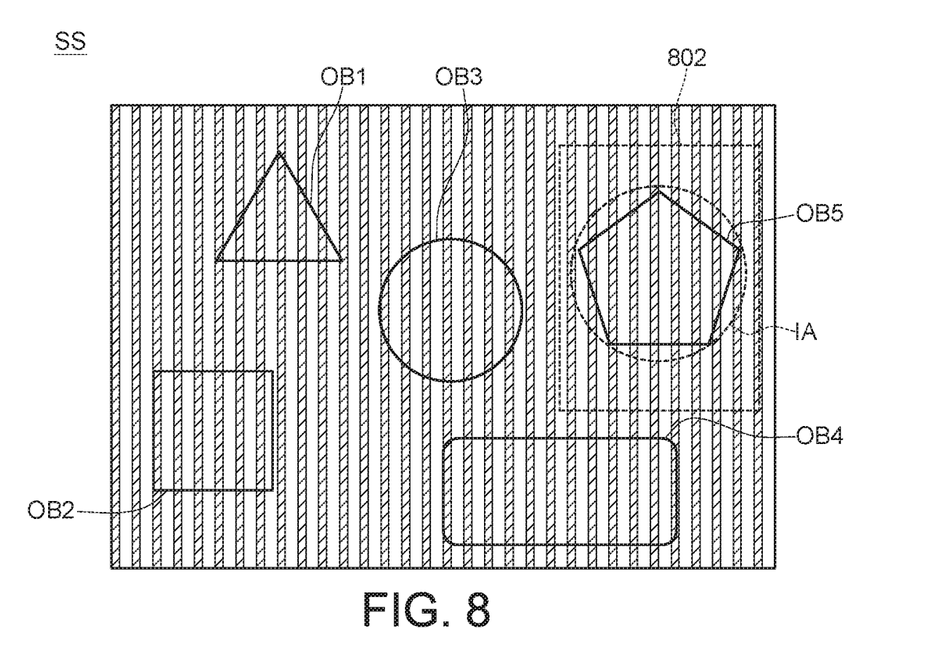
FIG. 8 is a schematic diagram of another example of differentiated processing of the scan data for different regions.

FIG. 8 is a schematic diagram of another example of differentiated processing of the scan data for different regions. The main difference between embodiments of FIGS. 7 and 8 is that in this embodiment, the scanning unit 106 performs a structured-light scan on the scenery SS based on a higher scanning resolution (e.g., higher than the default scanning resolution), while the computation control unit 104 performs the depth estimation only on the scan data of the first scanning region 802 corresponding to the interested field of view IA.

Figure 9:
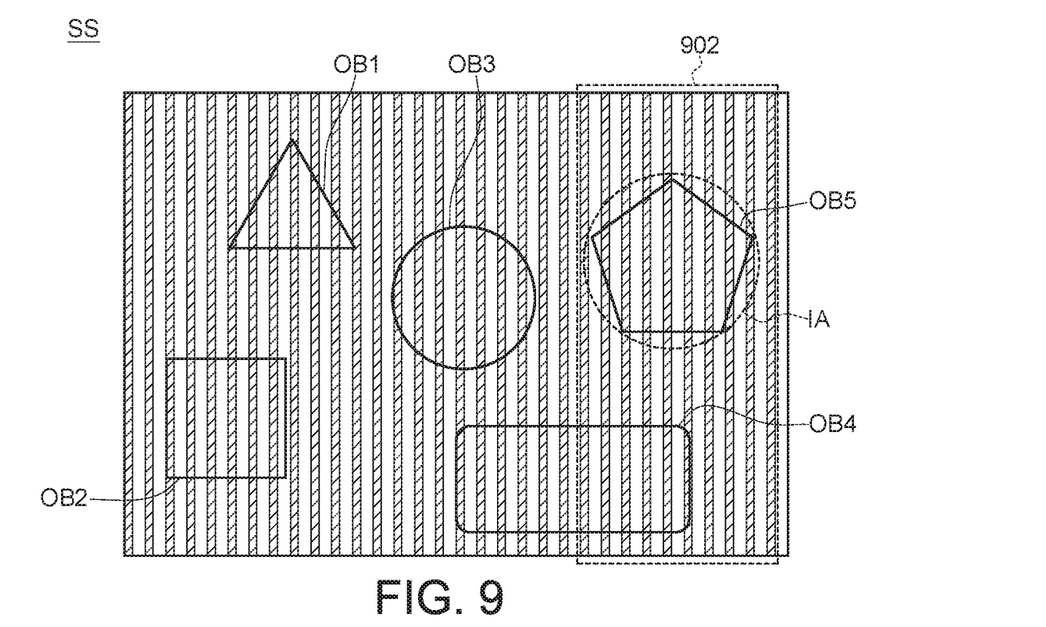
FIG. 9 is a schematic diagram of another example of differentiated processing of the scan data for different regions.

FIG. 9 is a schematic diagram of another example of differentiated processing of the scan data for different regions. The main difference between embodiments of FIGS. 8 and 9 is that in this embodiment, the range of the first scanning region 902 is adjusted in one direction only (e.g., the horizontal direction).

Figure 10:
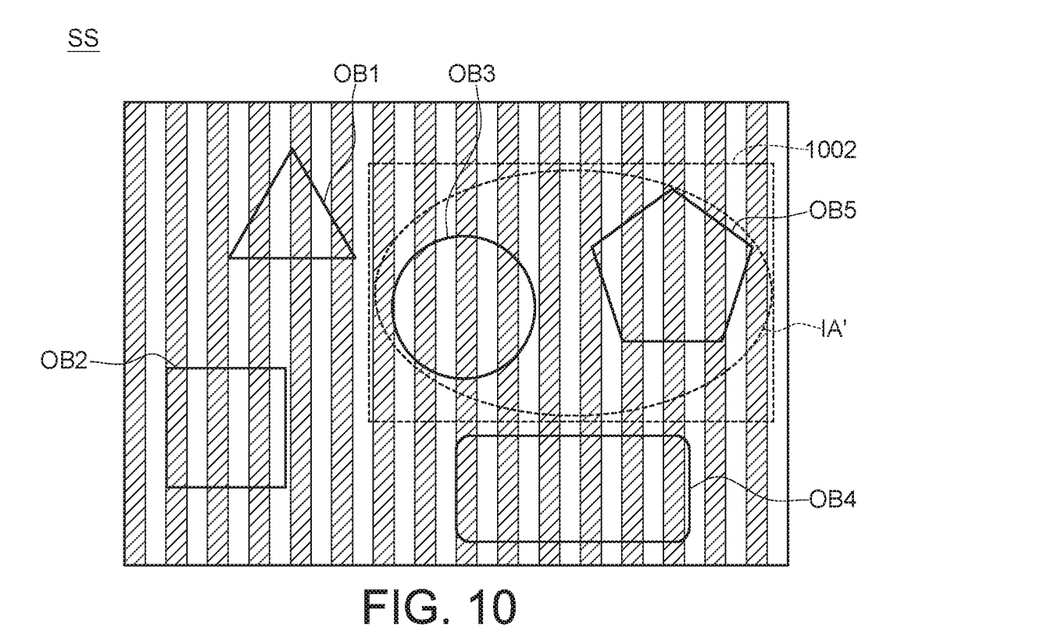
FIG. 10 is a schematic diagram illustrating a first scanning region defined by an interested field of view including a plurality of gazed objects.

Although the interested field of view IA merely includes one gazed object (OB5) in the abovementioned embodiments, the present invention is not limited thereto. As shown in FIG. 10, a first scanning region 1002 is defined by an interested field of view IA' including a plurality of gazed objects.

Specifically, after identifying a plurality of gazed objects (e.g., objects OB3 and OB5) from the interested field of view IA', the computation control unit 104 may adjust the first scanning region 1002 according to the position and profile of the gazed objects OB3 and OB5, so that the range of the first scanning region 1002 at least covers the gazed objects OB3 and OB5.

Figure 11:
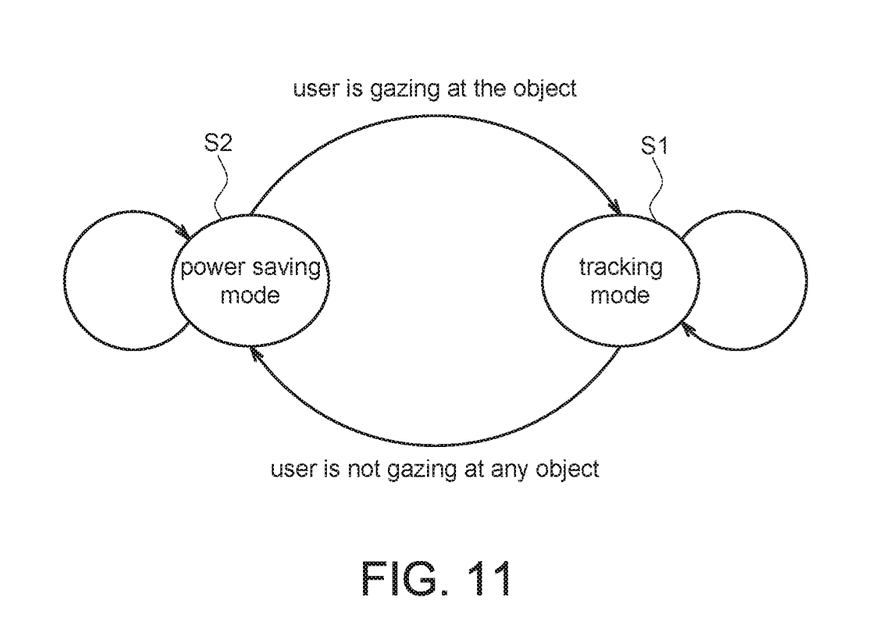
FIG. 11 is an example operation state diagram of the 3D measurement device in accordance with an embodiment of the present invention.

FIG. 11 is an example operation state diagram of the 3D measurement device in accordance with an embodiment of the present invention. The 3D measurement device described herein can be, but not limited to, the 3D measurement device 100 shown in FIG. 1.

In this example, the 3D measurement device 100 operates in a tracking mode S1 or a power saving mode S2 depending on whether the user is gazing at an object.

For example, the 3D measurement device 100 may detect the gaze duration of the user (e.g., the duration that the pupil staying at a position relative to a fixed reference point) through the field of view detection unit 102, and determine whether the gaze duration exceeds a time threshold through the computation control unit 104.

If the gaze duration exceeds the time threshold (which means that the user is gazing at the object), the 3D measurement device 100 enters the tracking mode S1. In the tracking mode S1, the 3D measurement device 100 performs different types of differentiated scanning and/or data processing on the first and second scanning regions, including increasing the first scanning resolution for the first scanning region for example.

On the other hand, if the gaze duration does not exceed the time threshold (which means that the user is not gazing at any object), the 3D measurement device 100 enters the power saving mode S2. In the power saving mode S2, the 3D measurement device 100 does not perform the differentiated scanning, and may perform a structured-light scan on the entire scenery based on a relatively low scanning resolution and/or scanning frequency, including decreasing the first scanning resolution for the first scanning region for example.

Based on the above, The proposed 3D measurement methods and devices can detect the region the user is currently gazing at and dynamically adjust the structured-light scanning parameters to differentiate scanning activities or data processing for different regions, thereby saving scan time, increasing processing speeds, and enhancing the scanning resolution in the user's field of view.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A three-dimensional (3D) measurement method, comprising:
    detecting a facial orientation and a gaze direction of a user through a field of view detection unit;
    determining an interested field of view according to the facial orientation and the gaze direction, and configuring a first set of scanning parameters according to the interested field of view through a computation control unit;
    performing a first structured-light scan on a first scanning region corresponding to the interested field of view based on the first set of scanning parameters, and selectively performing a second structured-light scan on a second scanning region which is outside the first scanning region based on a second set of scanning parameters through a scanning unit;
    detecting a gaze duration of the user;
    determining whether the gaze duration exceeds a time threshold;
    when the gaze duration exceeds the time threshold, entering a tracking mode to increase a first scanning resolution for the first scanning region;
    when the gaze duration does not exceed the time threshold, entering a power saving mode to decrease the first scanning resolution for the first scanning region; and
    adjusting the first scanning resolution for the first scanning region and a range of the first scanning region based on one or more gazed objects identified from the interested field of view.

2. The 3D measurement method of claim 1, wherein the first set of scanning parameters and the second set of scanning parameters are at least partially different from each other.

3. The 3D measurement method of claim 2, wherein the first set of scanning parameters comprises at least one of:
    the size, shape and position of the first scanning region,
    the first scanning resolution for the first scanning region,
    a first scanning frequency for the first scanning region, and
    a first scanning stripe pattern for the first scanning region; and
    the second set of scanning parameters comprises at least one of:
    the size, shape and position of the second scanning region,
    a second scanning resolution for the second scanning region,
    a second scanning frequency for the second scanning region, and
    a second scanning stripe pattern for the second scanning region.

4. The 3D measurement method of claim 3, wherein when the second structured-light scan is performed, the first scanning resolution for the first scanning region is higher than the second scanning resolution for the second scanning region.

5. The 3D measurement method of claim 3, wherein when the second structured-light scan is performed and the first scanning resolution for the first scanning region is the same as the second scanning resolution for the second scanning region, and the 3D measurement method further comprises:
    performing the first structured-light scan on the first scanning region to obtain a first scan data;
    performing the second structured-light scan on the second scanning region to obtain a second scan data; and
    adopting the first scan data, but not the second scan data, for depth estimation to obtain 3D morphology information of an object.

6. The 3D measurement method of claim 3, wherein when the second structured-light scan is performed and the first scanning resolution for the first scanning region is the same as the second scanning resolution for the second scanning region, the 3D measurement method further comprises:
    performing the first structured-light scan on the first scanning region to obtain a first scan data;
    performing the second structured-light scan on the second scanning region to obtain a second scan data; and
    adopting the first scan data and the second scan data for depth estimation to obtain 3D morphology information of an object, wherein the processing of the first scan data is prioritized over the processing of the second scan data in the computation control unit.

7. The 3D measurement method of claim 1, wherein the scanning unit has a default scanning resolution, and the 3D measurement method further comprises:
    increasing the default scanning resolution according to the position and profile of the one or more gazed objects, and using the increased default scanning resolution as the first scanning resolution for the first scanning region.

8. The 3D measurement method of claim 1, further comprising:
    adjusting the first scanning region according to the position and profile of the one or more gazed objects, so that the range of the first scanning region at least covers the one or more gazed objects.

9. A three-dimensional (3D) measurement device, comprising:
    a field of view detection unit configured to detect a facial orientation and a gaze direction of a user;
    a computation control unit configured to determine an interested field of view according to the facial orientation and the gaze direction, and configure a first set of scanning parameters according to the interested field of view; and
    a scanning unit configured to perform a first structured-light scan on a first scanning region corresponding to the interested field of view based on the first set of scanning parameters, and selectively perform a second structured-light scan on a second scanning region which is outside the first scanning region based on a second set of scanning parameters;

wherein the field of view detection unit detects a gaze duration of the user provided to the computation control unit to determine whether the gaze duration exceeds a time threshold;

when the gaze duration exceeds the time threshold, the 3D measurement device enters a tracking mode to increase a first scanning resolution for the first scanning region;

when the gaze duration does not exceed the time threshold, the 3D measurement device enters a power saving mode to decrease the first scanning resolution for the first scanning region; and the first scanning resolution for the first scanning region and a range of the first scanning region is adjusted based on one or more gazed objects identified from the interested field of view.

10. The 3D measurement device of claim 9, wherein the first set of scanning parameters and the second set of scanning parameters are at least partially different from each other.

11. The 3D measurement device of claim 10, wherein the first set of scanning parameters comprises at least one of:
the size, shape and position of the first scanning region,
the first scanning resolution for the first scanning region,
a first scanning frequency for the first scanning region, and
a first scanning stripe pattern for the first scanning region; and the second set of scanning parameters comprises at least one of:
the size, shape and position of the second scanning region,
a second scanning resolution for the second scanning region,
a second scanning frequency for the second scanning region, and
a second scanning stripe pattern for the second scanning region.

12. The 3D measurement device of claim 11, wherein when the second structured-light scan is performed, the first scanning resolution for the first scanning region is higher than the second scanning resolution for the second scanning region.

13. The 3D measurement device of claim 11, wherein when the second structured-light scan is performed and the first scanning resolution for the first scanning region is the same as the second scanning resolution for the second scanning region,
the scanning unit performs the first structured-light scan on the first scanning region to obtain a first scan data, and performs the second structured-light scan on the second scanning region to obtain a second scan data; and
the computation control unit adopts the first scan data, but not the second scan data, for depth estimation to obtain 3D morphology information of an object.

14. The 3D measurement device of claim 11, wherein when the second structured-light scan is performed and the first scanning resolution for the first scanning region is the same as the second scanning resolution for the second scanning region,
the scanning unit performs the first structured-light scan on the first scanning region to obtain a first scan data, and performs the second structured-light scan on the second scanning region to obtain a second scan data; and
the computation control unit adopts the first scan data and the second scan data for depth estimation to obtain 3D morphology information of an object, wherein the processing of the first scan data is prioritized over the processing of the second scan data in the computation control unit.

15. The 3D measurement device of claim 9, wherein the scanning unit has a default scanning resolution, and the computation control unit identifies the one or more gazed objects from the interested field of view, increases the default scanning resolution according to the position and profile of the one or more gazed objects, and uses the increased default scanning resolution as the first scanning resolution for the first scanning region.

16. The 3D measurement device of claim 9, wherein the computation control unit identifies the one or more gazed objects from the interested field of view, and adjusts the first scanning region according to the position and profile of the one or more gazed objects, so that the range of the first scanning region at least covers the one or more gazed objects.

* * * * *